(12) United States Patent
Daniello et al.

(10) Patent No.: US 8,843,460 B2
(45) Date of Patent: *Sep. 23, 2014

(54) METHOD ALLOWING VALIDATION OF LARGE VOLUME OF UPDATES IN A LARGE PRODUCTION DATABASE OF NEW ENTERED DATA PRIOR TO THEIR RELEASE

(75) Inventors: Rudy Daniello, Nice (FR); Sophie Desmonceau, Grasse (FR); Benoit Janin, Biot (FR); Rene Jullien, Nice (FR); Brigitte Ruscica, Grasse (FR)

(73) Assignee: Amadeus S.A.S., Sophia Antipolis (FR)

( * ) Notice: Subject to any disclaimer, the term of this patent is extended or adjusted under 35 U.S.C. 154(b) by 352 days.

This patent is subject to a terminal disclaimer.

(21) Appl. No.: 13/201,545

(22) PCT Filed: Feb. 16, 2010

(86) PCT No.: PCT/EP2010/051904
§ 371 (c)(1),
(2), (4) Date: Nov. 25, 2011

(87) PCT Pub. No.: WO2010/094675
PCT Pub. Date: Aug. 26, 2010

(65) Prior Publication Data
US 2012/0059802 A1 Mar. 8, 2012

Related U.S. Application Data

(63) Continuation-in-part of application No. 12/372,809, filed on Feb. 18, 2009, now Pat. No. 8,131,692.

(30) Foreign Application Priority Data

Feb. 17, 2009 (EP) .................................... 09305151

(51) Int. Cl.
*G06F 17/30* (2006.01)
(52) U.S. Cl.
CPC ............................... *G06F 17/30371* (2013.01)
USPC ......................................... 707/694; 707/802
(58) Field of Classification Search
None
See application file for complete search history.

(56) References Cited

U.S. PATENT DOCUMENTS 6,334,128 B1 * 12/2001 Norcott et al. .................... 1/1
7,627,574 B2 12/2009 Jain et al.
(Continued)

FOREIGN PATENT DOCUMENTS

| CN | 101046821 A | 10/2007 |
| CN | 101080714 A | 11/2007 |
| CN | 101350022 A | 1/2009 |

OTHER PUBLICATIONS

Seshardri P. et al.: "SQLServer for windows CE—a database engine for mobile and embedded platforms", Data Engineering, 2000. Proceedings. 16th International Conference on San Diego, CA, USA Feb. 29-Mar. 3, 2000, Los Alamitos, CA, USA, IEEE Comput. Soc, US, Feb. 29, 2000, pp. 642-644, XP010378761, ISBN: 978-0-7695-0506-0, p. 642-p. 644.
Kistler J. J. et al.: "Disconnected Operation in the Coda file system", ACM Transactions on computer Systems, ACM, NewYork, NY, US, vol. 10, No. 1, Feb. 1, 1992, pp. 3-25, XP000323223, ISSN: 0734-2071, p. 3-p. 25.
(Continued)

*Primary Examiner* — Son T Hoang
(74) *Attorney, Agent, or Firm* — Wood, Herron & Evans LLP

(57) ABSTRACT

A method of insuring the integrity of a plurality of updates brought in real-time to a large production database concurrently used by one or more software applications. The large production database includes a plurality of products participating to the definition of objects. The method first comprises the step of requesting the issuance of a unique filing number associated to a draft state version of the plurality of updates while keeping them invisible to the end-users of the large production database. Then, a set of product items identified as a whole by the unique filing number and on which the updates applies is created or copied in the large production database and gathered under the form of a meta-product on which the plurality of updates is applied. When updating is complete, the meta-product is successively set into a customizable flow of one or more validation states in order to perform a cross-validation of the plurality of updates. Finally, when validation is complete, the meta-product is set into a production state where the uniquely identified meta-product becomes immediately visible and useable by the end-users of the one or more software applications.

23 Claims, 3 Drawing Sheets

(56) References Cited

U.S. PATENT DOCUMENTS

| | | |
|---|---|---|
| 2005/0125325 A1* | 6/2005 | Chai et al. .................... 705/35 |
| 2005/0216321 A1* | 9/2005 | Veit ............................. 705/7 |
| 2007/0239751 A1* | 10/2007 | Wei et al. .................... 707/101 |
| 2007/0239798 A1* | 10/2007 | Shringi et al. ............... 707/201 |
| 2008/0052185 A1* | 2/2008 | Goel ............................. 705/26 |
| 2010/0077152 A1* | 3/2010 | Jain ............................. 711/133 |

OTHER PUBLICATIONS

International Search Report, dated May 25, 2010, from corresponding PCT application.
State Intellectual Property Office of the People's Republic of China, Office Action issued in related Chinese patent application No. 201080007819.0 dated Oct. 22, 2012, and translation thereof.

* cited by examiner

METHOD ALLOWING VALIDATION OF LARGE VOLUME OF UPDATES IN A LARGE PRODUCTION DATABASE OF NEW ENTERED DATA PRIOR TO THEIR RELEASE

FIELD OF THE INVENTION

The present invention relates generally to the updating of large databases and more specifically to a method allowing validation in a production database of new entered data prior to their release.

BACKGROUND OF THE INVENTION

In an increasingly interconnected world all significant providers of goods and services have to set up large and, most often, very-large databases holding the characteristics, specifications and costs of their products, services and global commercial offers. Operated under the control of a database management system (DBMS) contents are made accessible, simultaneously, to many online customers from all over the world, and also to the authorized administrators in charge of keeping database contents updated. In this environment databases must often be operated in real time, in a 24-hour-a-day/7-day-a-week mode.

In the airline industry, examples of such very-large database platforms are the ones that hold the airline fares along with the rules restricting their use. Fare databases are mainly set up by a few worldwide global distribution systems (GDSs) that provide travel services to all the actors of the travel industry and more specifically to traditional travel agencies and also to all sorts of other online travel service providers. For instance, AMADEUS is a world leading GDS.

One large provider of fares is the airline tariff publishing company (ATPCO), an organization owned by a number of domestic and international airlines that collects and distributes the latest airfares of many airlines around the world on a multi-daily basis. Another provider of fares is called SITA, a similar international organization. ATPCO and SITA provide fare data in an electronic form suitable for computer processing including all the rules associated with those fares. Fares and rules provided by airlines and coded by ATPCO and SITA are electronically transmitted to the GDSs mentioned above for being incorporated into their fare databases.

ATPCO and SITA are not however the only sources of fares for the GDS fare databases. A GDS like AMADEUS also provides software tools that let third-party fare providers file fares directly into its fare and pricing database platform. Indeed, a good deal of fares created on a daily basis by airline companies, and travel service companies on behalf of airlines, is negotiated fares. Contrary to public fares, negotiated fares are contracted between, e.g., an airline company and a particular travel agency or travel organization for its private use. They are often filed directly into GDS fare database thus bypassing ATPCO and SITA.

However, direct filing of fares does not go without posing its own set of problems. The fare and pricing database platform is a complex and very-large database which is continuously in use and must sustain real-time commercial transactions while being updated. Especially, filing of new fares along with the associated data such as the rules that restrict their use and the available routes requires that many transactions all complete successfully before actually getting a consistent set of updated data tables that can translate into new useable fares.

It is thus the object of the invention to describe a technique to update a large database, such as a GDS fare database, without disturbing its normal operation while its updating (i.e., entry of new fares) is in progress. It is a specific object of the invention to allow a validation of the new fares before they become visible and can be actually used by the end-users of the database.

Thus, the present invention specifically addresses the problem of updating large volume of data in large databases. In the present invention a large database or a large production database designates a database that occupies more than 1 terra bytes (1024 gigabytes) or contains more than a billion rows. In the present invention, a large volume of updates means a flow of more than 500 000 updates per day and/or several millions of read access per day.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes a method of insuring the integrity of a large volume of updates brought in real-time to a large production database concurrently used by one or more software applications. The production database includes a plurality of products participating to the definition of objects. The production database is coupled to a microprocessor arranged so that the method performs the following steps. The method first comprises the step of requesting the issuance of a unique filing number associated to a draft state version of the plurality of updates while keeping them invisible to the end-users of the production database. Then, a set of product items identified as a whole by the unique filing number is created or copied from the production database, recorded in the production database, and gathered under the form of a meta-product on which the plurality of updates is applied. The copy is limited to the set of data that must be updated through the validation. When updating is complete, the meta-product is successively set into a customizable flow of one or more validation states in order to perform a cross-validation of the plurality of updates. Cross-validation means that a plurality of validations can be performed. Said plurality of validations can be performed by identical or different entities or teams. Said plurality of validations can comprise identical or different steps of validation. A cross validation can also concern a plurality of products, allowing thereby to modify a number of different products participating to the calculation of a price and to validate all the updates in one shot. A cross validation can enable validating a combination of all performed updates.

Finally, when validation is complete, the meta-product is set into a production state where the uniquely identified meta-product becomes immediately visible and useable by the end-users of the one or more software applications.

The invention may also comprise optionally one of the following features:

The large production database occupies more than 1 terra bytes (1024 gigabytes) or contains more than a billion rows.

The large production database can receive more than 500 000 millions of updates per day and more preferably more 2 millions of updates per day.

The large production database can receive more than 5 millions of read access per day and preferably more than 15 millions of read access per day.

The customizable flow of one or more validation states includes a manual validation state which does not allow the update of the meta-product.

The customizable flow of one or more validation states includes an applicative validation state which allows simulating the one or more software applications on the meta-product.

The meta-product is merged with whichever non updated production products that are necessary to simulate the one or more software applications on the meta-product.

The applicative validation state allows updating and deleting data from the meta-product.

The applicative validation state allows displaying by the one or more applications the meta-product as if it were a production product.

The customizable flow of one or more validation states allows returning the meta-product to the draft state if cross-validation of the plurality of update fails.

The customizable flow of one or more validation states allows setting the meta-product into the production state.

The production state only allows an expert team to update the meta-product.

The production state allows updating any product.

The customizable flow of one or more validation states includes only a manual validation state.

The production database is a database of fares and the one or more software applications include a pricing engine.

The invention also concerns a computer program product stored on a computer readable storage medium, comprising computer readable code means for causing at least one computer to operate the above method.

Thus, the invention adds a "layer" between the database engine and the pricing transactions in order to provide to the pricing transactions all the data corresponding to a validation context i.e. data updated in the validation context and production data.

The invention does not require any replication of database. The invention does not require an additional database. It allows large update in a single database while said database is continuously and simultaneously used to answer end-user queries. The copy of data is limited to the set of data that is going to be updated in the validation context. This aims at making easier the user's updates without increasing the complexity of the system.

Another object of the invention is a system comprising one or more data storage means storing at least a production database. The system also comprises a microprocessor coupled to the data storage means and arranged for performing the above described method.

The invention further concerns a server side or a client side of a computer program product stored on a computer readable storage medium, comprising computer readable code means and a microprocessor arranged for causing at least one computer to operate the above method.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
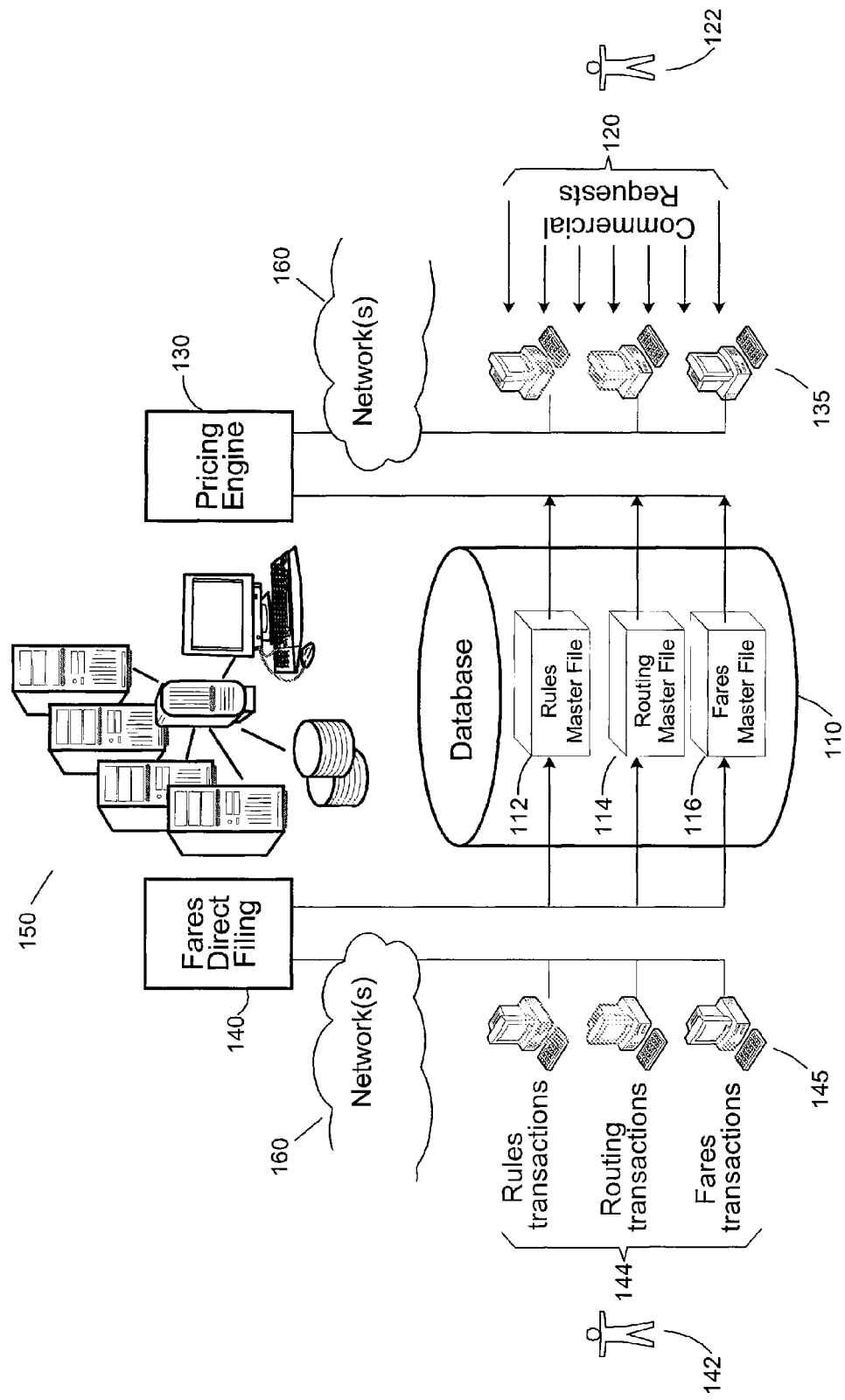
FIG. 1 shows an example of a large continuously operational database for which the updating technique of the invention best applies.

FIG. 1 shows an example of a large continuously operational database for which the updating technique of the invention best applies.

The database (110) of this example used to illustrate the invention is a fare database of the kind set up by GDSs from their large computing and storing resources (150) to allow pricing of travel solutions. This example is chosen to enhance the understanding of the invention and does not limit the invention to fare databases or to commercial offers.

GDS resources are made available online through any combination of networks including the Internet (160) and the use of the corresponding standard protocols. The pricing requests are received (120), e.g., from the traditional travel agencies affiliated to the GDS to complete travel commercial transactions on behalf of the travelers, clients of the travel agencies. Pricing requests are also received from numerous online travel sites in order to price the travel solutions selected by end-users of the sites. Whichever the source of the pricing request, a pricing engine application (130) operated by the GDS uses the fare database to establish the cost of the travel solutions. Pricing requests are issued by agents of travel agencies from their computer terminals and by end-users typically accessing various online travel sites from their personal computers through a standard client application, i.e.: a web browser or a navigator (135).

Thus, in the context of the present invention a "commercial offer" includes all types of tariffs provided by industry, such as airline industry, to their distribution network like web sites, travel agencies or corporations etc. This commercial offer is distributed by GDS through a wide range of pricing transactions, also called commercial transactions answering to various customers' needs providing different types of results in term of results' number or content (like the X lowest applicable prices or the X lowest available prices for an itinerary).

As mentioned in the background section new fares are created on a daily basis. Direct filing of fares is achieved through a dedicated software platform (140) running from GDS computing resources in a standard client/server mode. Then, the direct filing software platform let fare providers manually file negotiated fares from the corresponding client applications (145) through a graphic user interface (GUI). Negotiated fares are fares that result of agreements and contracts signed between, e.g., airlines and travel agencies and, generally, between any fare providers and any travel service providers that do not use the services provided by ATPCO or SITA.

The introduction of new fares must be done in real-time however without disturbing the regular operation of the database which remains continuously interrogated through the pricing engine (130) in order to answer the commercial requests (120) issued from the here above mentioned travel agencies and online travel sites, i.e., by travel agents and individual end-users of the sites (122). The fare database is comprised of several elements, hereafter referred to as products. Said products participate to the definition of objects which are for instance global commercial offers in the described example. The products must be consistently updated to eventually get a valid fare that becomes commercially useable. The products are updated through independent dedicated transactions (144) with the database. Transactions are issued by those in charge of entering, updating or deleting fares through the direct filing software platform (140) provided by the GDS. They are broadly referred to as the filing team (142) in the following. Creation, update or deletion of data are performed manually. The products include the rules (112) that translate the terms and conditions of the negotiated contract in the form of restrictions that apply when buying the new fare. The routes on which the new fare applies are defined in a second product (114) while the individual fare amounts are in a third product (116). There are at least as many transactions to issue as products to update. Then, the main problem lies in the fact that all product modifications are becoming immediately visible to the pricing engine (130) while a new fare is being created. This may cause incoherencies as long as not all the transactions have actually completed so that all products are updated in a coherent way for the new fare and also made compatible with all the already existing fares.

Another problem tied to the fact that all modifications are immediately visible is that no validation of the new fares is in practice possible. Air fares are particularly complex and subject to the application of many rules. The parties involved in a negotiated fare (e.g., an airline and a travel agency) cannot however conveniently preview how a contract translates into a new fare unless it is actually also made immediately available for the regular commercial transactions. A new fare cannot be built and tested in advance by the filing team, i.e., before the date it is scheduled to be released and put in production mode.

Figure 2:
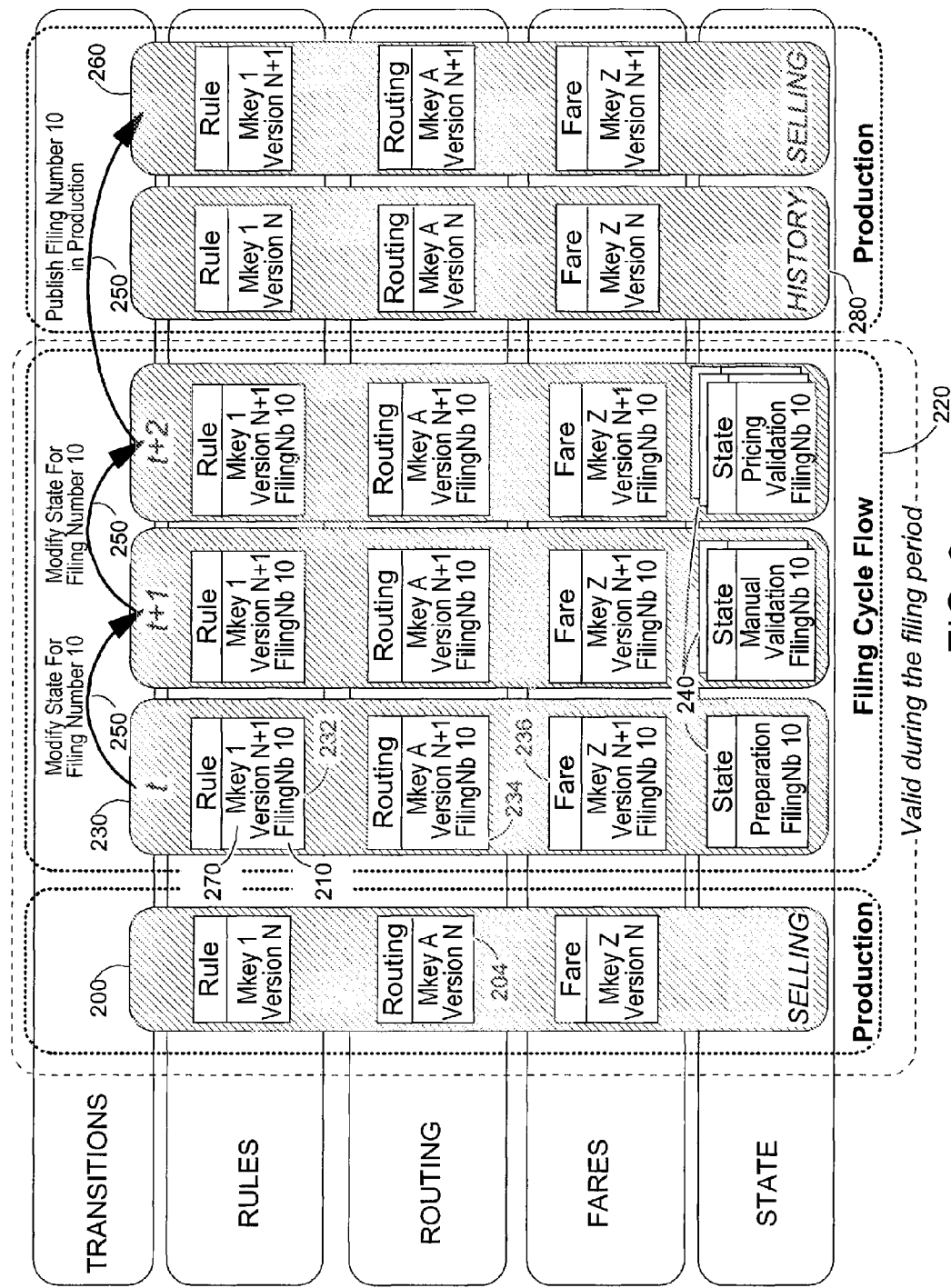
FIG. 2 describes the means used by the invention to update products of a continuously operational database during a filing cycle flow that controls the visibility of the updates until they are put in production.

FIG. 2 describes the means used by the invention to update products of a continuously operational database during a filing cycle flow that controls the visibility of the updates until they are put in production.

The coherence of the updates on several products part of a global commercial offer is achieved through the use of a filing number (210). The filing number is made unique and its validity is linked, as further discussed, to the filing cycle flow (220) to which it belongs. It is attached to any update done on any of the products defined in the database. A filing number thus uniquely identifies a particular update among a set of updates. Hence, all the data tagged with a same filing number form a meta-product (230) which is managed as a unique entity by the system. The filing team is responsible of the identification of the set of updates and of its functional coherence.

A filing cycle flow (220) is made of states and transitions:

A state (240) is associated with a filing number (210). It determines the actions that can be done on the set of data (230) identified by the filing number. The last state of the filing cycle flow corresponds to the publication of the data (260) when updates are put in production. When this state is reached the filing number becomes obsolete. A new unique filing number will be needed if more updates have to be processed.

A transition (250) is an action which changes the state of a set of data to another one. As further discussed in the following, from a state, several transitions are proposed to the filing team in order to possibly reach another intermediate state before updates are eventually put in production. It is always possible to publish the data in production from any state and also to delete the corresponding whole set of data if update session must be canceled. Only the data already in production (200-260) can not be removed from the system because they may have been already used to price and sale tickets.

Based on the above concepts of states and transitions a filing cycle flow can thus be customized to fit the needs of a particular filing team and way of working of their organization. This is why the flow is named customizable flow.

Figure 3:
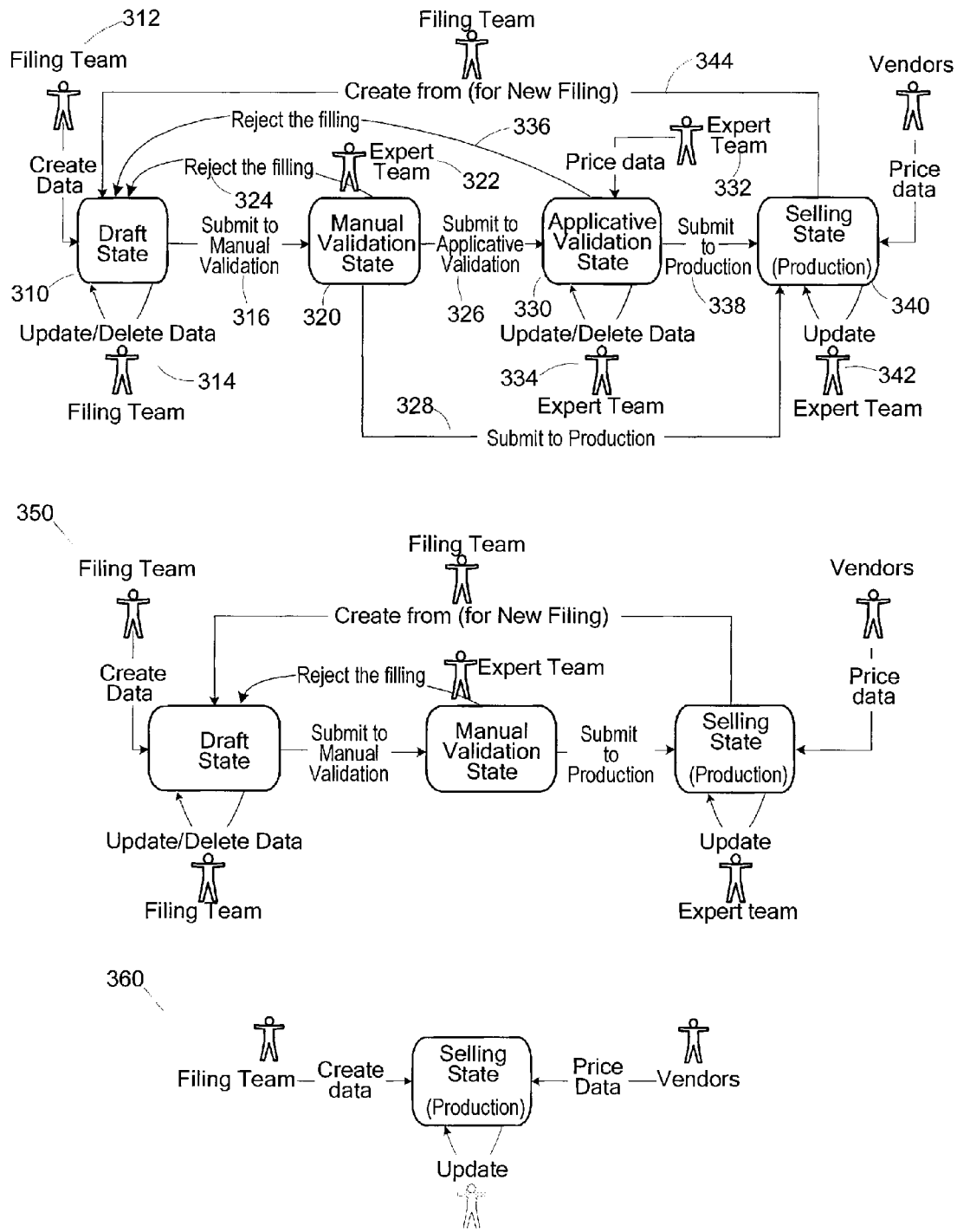
FIG. 3 is an example of an updating cycle flow including up to four states with the corresponding transitions.

This customizable flow of validation states is further discussed in FIG. 3.

To guarantee the coherence of the system some restrictions apply through:

The granularity of the update in each master file (set of database tables dedicated to a product) is determined by a set of identification fields called Mkey's (270). Only one filing number (210) is permitted to be associated with an Mkey so that there is possibly only one cycle of updates active at a time on a given set of data (230).

Any new filing must always start from the existing data (200) if any. At the end of the current filing cycle flow, the new data are merged with the old ones. They must be kept coherent.

On an implementation point of view, a state (240) is a field stored in a database table. It qualifies a set of data identified by a unique filing number. The association filing number-state is stored in a separate table. Each time the state is modified for a given filing number a new association is created and kept in the filing cycle flow (220). The filing number is attributed at the beginning of the filing cycle and used by the filing team to identify a set of updates concerning several products in the database. The last attributed filing number is stored in a dedicated table.

On the product side, a new version is created for each Mkey (270) at the beginning of the filing cycle flow: it is either a brand new Mkey, when the data do not already exist in the master file, or it is a copy of the existing data in production. During the whole filing cycle flow, only the last update of the data is kept in the database. For a given filing number, there is only one version of an Mkey. However, several Mkey's of a product can be identified by the same filing number.

As further discussed in FIG. 3, the filing system of the invention is thus open and flexible enough to let the filing team in charge of creating new fares for an organization to customize the filing cycle flow (220) to their organization's needs by having an appropriate number of intermediate validation states before a new fare is released and used in production. The management of the filing activity is done directly in the production database. For a given set of data, two versions can live together in the database: one corresponding to the production activity, one corresponding to the filing activity. As soon as the version under validation is promoted, it becomes the new version targeted by the pricing engine.

This way of filing has many advantages. The database needs not to be duplicated. Only the products being updated exist in two versions. Indeed, a possible solution to the problem solved by the invention would be to have a standby duplicated database in which all updates would be done and checked before the standby database is put in turn in production replacing the active database at scheduled times. This way of doing presents drawbacks in comparison with the invention. Indeed, such solution requires to manage and store two large and complex databases. Also, contrary to what is feasible with the filing system of the invention, an update could not be put in production as soon as it has been thoroughly checked since it would have to wait the next scheduled swapping to become visible by the end-users of the database.

Also, the filing team does not need to create a version for all products defined in the database but only for the ones that must be modified. Even though products are not all modified the validation of the updates can be conducted normally. In this case, the filing system of the invention just retrieves the non-updated products necessary to perform the validation. Necessary non-updated products and updated products are thus merged to permit the validation of the updated products.

With the example used to illustrate the invention, if only the rule product (232) and the fare product (236) need to be modified; then, the non-updated other product of this example, i.e., the routing product (234), needs not actually to be included (as shown in FIG. 2) in the meta-product identified by a unique filing number (210). In which case, the filing system of the invention, to perform the validation of the updates, will just pick by default the production version of the non-updated product (204) instead. This avoids the creation of useless data in the database, i.e. the duplication of production versions without modification.

FIG. 3 is an example of a filing cycle flow including up to four states with the corresponding transitions.

The defined states are as follows:

| | |
|---|---|
| Draft | The draft state (310) corresponds to the preparation phase, when the filing team is entering (creating) new data (312) into the production database with the filing system of the invention. While in this state, members of the filing team can do as many updates (314) as necessary on the new entered data. When done new data is normally submitted (316) to the next validation state. It is worth noting here that the new entered data (referenced by a same filing number) can be all deleted as long as they have not been promoted to the last state: the production state (where they become visible and can be used immediately by a pricing engine). |
| Manual validation | The manual validation state (320) corresponds to a first identified type of validation to be done by specialized members of an expert team (322). In the example of the fare database used to illustrate the invention, this state corresponds to the validation of the non price able elements of the new fare (rules and routes). While in this state, updates are forbidden in order to keep unchanged the data being currently validated. Manual validation may lead to reject the filing (324) so that to get back to the previous state (where data can be further modified by the filing team). Otherwise, the new entered data are possibly submitted (326) to a second type of validation. A third option may consist in submitting the new entered data directly to the last state, i.e.: to the production state (340) |
| Applicative validation | The applicative validation state (330) corresponds to a second identified type of validation by specialized members of an expert team. In the example of the fare database this corresponds to the validation of the price able elements of the new fare by the team of fare experts (332) which may invoke the pricing engine as if the new entered data were already published. In this state, which is normally intended to finalize the filing, fare updates are allowed (334) because this phase is most of the time done assuming the new entered data are indeed price able (since the other elements have already been validated at previous state). The new data can however be rejected (336) by the expert team if necessary. If not, the new data can be submitted any time after to the production state (338). The transition to the production state can thus be postponed until the date chosen to release the new fare. |
| Selling | The selling state (340) corresponds to the production state. When the data are published they become immediately available to the pricing engine. To maintain full compatibility with the legacy filing system updates in the production state are permitted (342) so that the changes made by members of the expert team can still be made immediately visible to the pricing engine as in the legacy system.<br>Also, the filing team is left with the opportunity of using production data (344) to start with when creating a new fare rather than entering a whole new set of data. |

The above exemplary filing cycle can be adapted to any organization's needs. The number of states is not limited. New requirements may be considered and new states added to the flow if necessary. A state defines the actions allowed on the data so that they can be updated, deleted, processed or just only read. Also the permitted transitions to and from the states are part of the definition of the filing cycle. The definition of a new state must be coherent with the existing flow and it can imply the development of new actions.

The exemplary filing cycle of FIG. 3 can also be simplified as shown in (350) where there is only one validation state. And, as already mentioned above a single production state can be considered (360) in which case the modifications become immediately visible to the pricing as in legacy systems.

Hence, the foregoing described database filing system retains from legacy systems the ability, for the filing teams and their organizations, to react in real time to the competition because the database updates can still be made instantaneous (360).

Yet, the filing of new contracts may also include optional preparation and validation phases that can be tailored to fit any organization management needs:

The filing of a new contract can represent a big volume of data to be entered that may span several days. In the meantime the filing system of the invention prevents new entered data to be accessed by the pricing engine.

Once the whole contract is filed in the database, contents can still be thoroughly checked in the actual production environment before it is published. For the exemplary fare database used to describe the invention this part is mostly done by experts of the travel client company or by the airlines themselves when the filing has been contracted out. A filing cycle (350) including a simple validation, called manual validation, based on the consultation of the data stored in the database or an extraction from the database in a report, can be performed. A more thorough validation, called applicative validation (330), based on the actual processing of the data by the pricing engine as if they were already published, can optionally be performed as well.

Finally, the database filing system of the invention let filing or expert teams control the publishing of a new contract anytime after the validation has completed so that contract can safely be prepared in advance and, possibly, withdrawn until the last state (production state) is not entered.

While the enhancements that the invention provides are particularly advantageous for airline industry, the scope of the invention extends to other transportation modes such as train, car, bus, ferry etc. Then data to be updated may correspond to fares related to air, ground, rail or sea products.

The embodiment that is described above has turned out to be very efficient for updating large volumes of data in a single database presenting the following features: 2 Terra bytes, 1256 tables, 1774 indexes. More than 2, 4 millions of updates and 23 millions of read access were performed per day.

The scope of this invention also extends to hotel industry and the data to be updated may correspond to hotel fares/rates. Although the invention is described above in connection with an example involving fares and commercial offers, its scope extends to all kind of data for which it is advantageous to insure integrity of updates brought in real-time to a production database. For instance, the production database can include products participating to the definition of an industrial manufacturing process. In this case end-users may be industrial machines or technicians.

The invention claimed is:

1. A method for updating a production database concurrently used by one or more software applications, the method comprising:
   in response to receiving an update request, requesting the issuance of a unique identifier associated to a draft state version of a plurality of updates to the production database while keeping the plurality of updates invisible to the at least one software application, wherein the production database includes a plurality of product items and occupies more than one terabyte or contains more than a billion rows, the product items comprising fares, rules applying to fares, and routes associated to fares;
   within the production database, creating or copying from the production database a set of product items to be updated and validated, the set of product items to be updated and validated being identified by the unique identifier and being gathered as a meta-product stored at the production database on which the plurality of updates is applied, wherein the meta-product is a logical grouping by the unique identifier of the set of product items to be updated and validated;
   updating the product items of the meta-product based on the plurality of updates and setting the meta-product to a draft updated state;
   validating the updated product items of the draft updated state of the meta-product with at least one form of validation; and
   in response to successfully validating the updated product items of the meta-product with the at least one form of validation, setting the meta-product from the draft updated state to a production state such that the updated product items of the meta-product become immediately visible and useable at the production database by the at least one software application.

2. The method of claim 1, wherein each validation state qualifies actions that can be done on the meta-product identified by the unique identifier, the validation state being a field stored in association with the unique identifier in a separate table.

3. The method of claim 1, wherein the flow of the one or more of the plurality of validation states includes a manual validation state which does not allow updating of the meta-product.

4. The method of claim 1, wherein the flow of the one or more of the plurality of validation states includes an applicative validation state which allows simulating the one or more software applications on the meta-product.

5. The method of claim 4, wherein the meta-product is merged with whichever non-updated product items that are necessary to simulate the one or more software applications on the meta-product.

6. The method of claim 4, wherein the applicative validation state allows updating and deleting data from the meta-product.

7. The method of claim 4, wherein the applicative validation state allows displaying by the one or more software applications the meta-product as if it were in a production state.

8. The method of claim 1, wherein the flow of the one or more of the plurality of validation states allows returning the meta-product to the updated draft state if validation of the one or more of the plurality of updates fails.

9. The method of claim 1, wherein the flow of the one or more of the plurality of validation states allows setting the meta-product into the production state.

10. The method of claim 1, wherein the production state only allows an expert team to update the meta-product.

11. The method of claim 1, wherein the flow of the one or more of the plurality of validation states includes only a manual validation state.

12. The method of claim 1, wherein the flow of the one or more of the plurality of validation states is customizable.

13. The method of claim 1, wherein more than five million read accesses per day are received at the production database.

14. The method of claim 1, wherein more than 500,000 updates per day are brought to the production database.

15. The method of claim 1, wherein the plurality of updates are brought to the production database from a plurality of airlines through a dedicated platform.

16. The method of claim 1, wherein the plurality of updates is brought to the production database from travel service companies on behalf of a plurality of airlines.

17. A computer program product stored on a non-transitory computer readable storage medium, comprising computer readable instructions for causing at least one computer to operate the method of claim 1.

18. A system comprising one or more data storage means storing at least a production database, the system comprising at least one microprocessor coupled to the data storage means and arranged for performing the method of claim 1.

19. The method of claim 1, wherein the unique identifier comprises a unique filing number.

20. A method for updating a production database concurrently used by at least one software application, the method comprising:
   requesting the issuance of a unique identifier associated to a draft state version of a plurality of updates to the production database while keeping the plurality of updates invisible to end-users of the production database, wherein the production database includes a plurality of product items and occupies more than one terabyte or contains more than a billion rows, the product items comprising fares, rules applying to fares, and routes associated to fares;
   within the production database, creating or copying from the production database a set of product items to be updated and validated, the set of product items to be updated and validated being identified as a whole by the unique identifier and being gathered as a meta-product, wherein the meta-product is a logical grouping by the unique identifier of the set of product items to be updated and validated and on which the plurality of updates is applied;

when updating of the meta-product is complete, and the meta-product being in a draft updated state, successively setting into a flow of one or more of a plurality of validation states the meta-product in order to perform at least one validation of the plurality of updates, the one or more of the plurality of validation states comprising at least one of: validations performed by different entities and different steps of validation; and when validation of the meta-product is complete, setting the uniquely-identified meta-product from the draft updated state into a production state which allows the meta-product to become immediately visible and useable by the end-users of the one or more software applications.

21. A computer program product stored on a non-transitory computer readable storage medium, comprising computer readable instructions for causing at least one computer to operate the method of claim 20.

22. A system comprising one or more data storage means storing at least a production database, the system comprising at least one microprocessor coupled to the data storage means and arranged for performing the method of claim 20.

23. The method of claim 20, wherein the unique identifier comprises a unique filing number.

\* \* \* \* \*